Sept. 3, 1968  A. A. MATTHIES  3,399,543
VALVE WITH BIMETAL OPERATOR MEANS
Filed Dec. 21, 1966

Inventor
Alan A. Matthies
By Joseph A. Genignani
Attorney.

United States Patent Office 3,399,543
Patented Sept. 3, 1968

3,399,543
VALVE WITH BIMETAL OPERATOR MEANS
Alan A. Matthies, Milwaukee, Wis., assignor to Controls Company of America, Melrose Park, Ill., a corporation of Delaware
Filed Dec. 21, 1966, Ser. No. 603,466
9 Claims. (Cl. 62—202)

This invention relates to fluid flow control devices of the type which achieve control in accordance with the condition of the medium being controlled and, more particularly, relates to an improvement in bimetal-operated valves of the type disclosed and claimed in U.S. Patent No. 3,205,675 to Alan A. Mattheis, entitled, "Valve With Bimetal Means for Refrigeration System," and assigned to the assignee of this application.

Bi-metal-operated valves of the type disclosed in the above identified patent are known in the art and control flow in a system in accordance with the condition of the medium flowing in the system at a point downstream of the valve. A common type of application for such valves is in a refrigeration system where the valve controls flow of refrigerant into the evaporator and is itself controlled by an operator assembly which functions on the basis of the condition of the refrigerant leaving the evaporator. The above identified patent to Alan A. Matthies is an example of such a valve. The valve operator is sentitive to changes in the temperature and state of the refrigerant leaving the evaporator and adjusts the valve to vary the flow rate to maintain a desired condition of the refrigerant as it leaves the evaporator, for example a super-heat condition if desired.

This invention is concerned with the accuracy of control of such valves and their tendency to over-compensate when exposed to refrigerant in a liquid state and thereby cause the valve to hunt.

A general object of this invention is to decrease the tendency of such valves to over-compensate in response to liquid refrigerant leaving the evaporator.

Another object of this invention is to simplify and improve the overall accuracy of condition responsive flow control valves.

A further more specific object of this invention is to decrease the tendency of such valves to hunt.

Although this invention may have application in other fields, it will be discussed in connection with a refrigeration system. Generally such valves include a heat activated operating member connected to a movable valve member which determines the flow rate through the valve. A heater is associated with the heat activated operating member and when the heater is energized the operating member produces a base valve opening and base flow rate. The operating member is then exposed to the condition of the refrigerant leaving the evaporator and varies the position of the valve, and correspondingly the refrigerant flow, in accordance with the condition of the refrigerant at that point. For the achievement of the above mentioned and other objects, this invention proposes to isolate the operating member from direct impingement by liquid which may be leaving the evaporator. This is accomplished by use of a barrier which prevents direct impingement of liquid on the operating member but which also permits the temperature ambient the operating member to correspond to the condition of the refrigerant leaving the evaporator.

Other objects and advantages will be pointed out in, or be apparent from, the specification and claims, as will obvious modifications of the embodiment shown in the drawings, in which:

Figure 1:
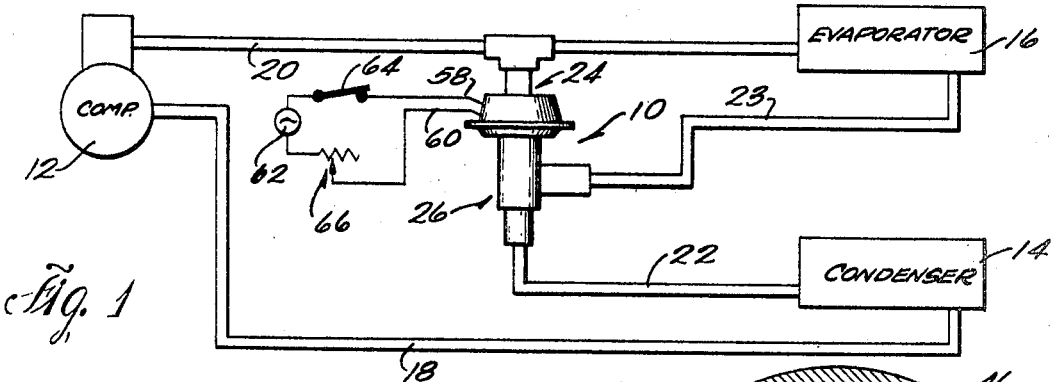
FIG. 1 is a schematic drawing of a refrigeration system incorporating a flow control device constructed in accordance with this invention.

With particular reference to the drawings, a fluid flow control device, valve 10, is illustrated as incorporated in a refrigeration system and is specifically referred to in such an application as a thermostatic expansion valve. However, as previously stated the valve of this invention is not necessarily limited to any specific use. In accordance with conventional practice the refrigeration system includes a compressor 12, a condensor 14 and an evaporator 16 all of conventional construction. The compressor and condenser are connected by conduit 18 and the evaporator an compressor are connected by conduit 20 with the condenser and evaporator being connected by conduits 22, 23 and valve 10. The valve includes an operator section 24 connected to conduit 20, the suction line, and a flow control portion 26 through which refrigerant flows from the condenser to the evaporator. In a manner to be described more completely hereinafter, refrigerant flow through control portion 26 is determined in accordance with the temperature and/or state of the refrigerant leaving the evaporator and as sensed by operator portion 24. This type of operation is also more completely described in the above mentioned patent and reference is made to that patent for a more detailed explanation if required.

Figures 2, 3:
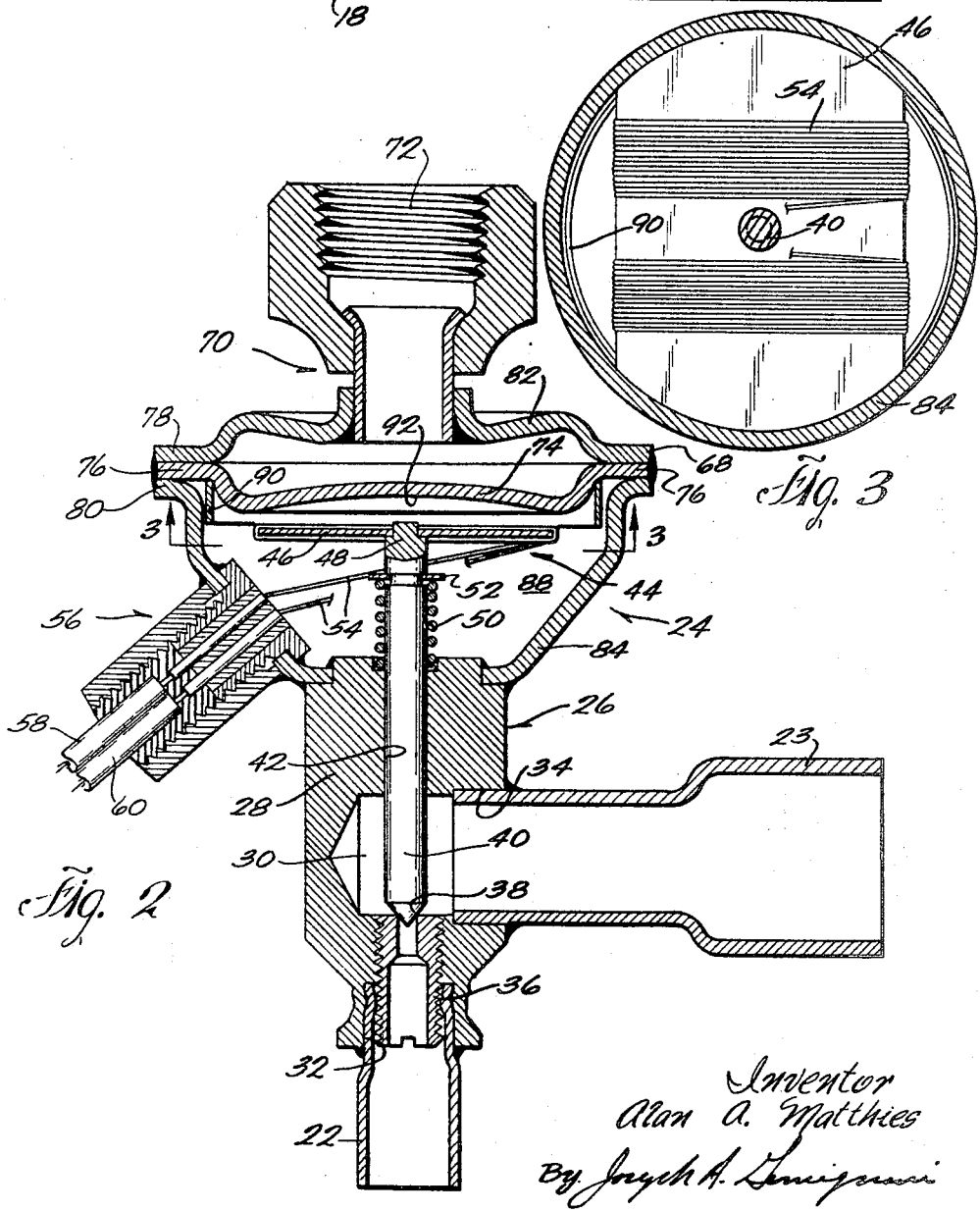
FIG. 2 is a section through the flow control device.
FIG. 3 is a section view taken generally along line 3—3 of FIG. 2.

With this brief description of the refrigeration system and the arrangement of the valve in that system, the construction of the valve will be described. With reference to FIG. 2, flow control portion 26 includes a body section 28 having a flow passage 30 extending therethrough and terminating in relatively spaced inlet and outlet openings 32 and 34. Conduit 22 is connected in inlet opening 32 and, similarly, conduit 23 is connected in outlet opening 34 to complete the connection of the flow control portion between the condenser and evaporator as illustrated in FIG. 1.

Insert 36 is received in passage 30 and defines a restricted orifice between the inlet and outlet openings. End 38 of insert 36 forms a valve seat and cooperates with an elongated valve needle 40 to control flow through the valve. More particularly, valve needle 40 is supported in an elongated bore 42 in body section 28 and is movable axially in that bore to vary the opening at orifice end 38 and thereby achieve the desired amount of flow through the valve. Valve needle 40 is moved axially in body section 28 to achieve the necessary opening at orifice 38 and, correspondingly, produce a desired rate of flow through the valve. More particularly, movement of valve needle 40 is achieved by a condition controlled operating assembly 44 arranged in operator portion 24. Operating assembly 44 includes a bimetal plate 46 which is connected to end 48 of valve needle 40. The upper side of bimetal plate 46 is supported in a manner to be described more specifically hereinafter and a coil spring 50 is seated betwen body section 28 and a washer 52 attached to the valve needle. Coil spring 50 biases the valve needle upwardly in engagement with bimetal plate 46 and urges the bimetal plate against its support so that the valve needle follows the movement of the bimetal plate. In accordance with conventional practices an electrically energized heater is associated with the bimetal plate 46 so that when the heater is energized the bimetal plate deflects to produce movement of valve needle 40. In the preferred, illustrated embodiment of this invention a length of insulation covered Nichrome wire 54, or the like, is wound directly on bimetal plate 46. This places the heater wire in good heat transfer relation with the bimetal plate for effective operation. Nichrome wire 54 is connected through terminal assembly 56 and leads 58 and 60 to a suitable electrical source. For example, terminals 58 and 60 are connected to a suitable source of alternating current 62 and the control circuit includes an on-off switch 64 and a variable resistance 66 which are effective to control the amount of current flowing to the heater.

The arrangement of the support for bimetal plate 46, and valve needle 40 is such that when the bimetal is cool and in its normal position the valve needle is closed on orifice end 38. In operation Nichrome wire heater is energized an the bimetal plate is constructed so that when heated the plate bows upwardly as viewed in FIG. 2. Coil spring 50 causes valve needle 40 to follow the movement of bimetal 46 and hence lifts valve needle 40 from seat 38 to open the passage to refrigerant flow. By controlling the amount of current supplied to the heater a predetermined base flow rate can be established through the flow control device. The valve needle then modulates about the base opening in accordance with heat transfer between the bimetal plate and its ambient.

Operating assembly 44 is positioned within a chamber defined by outer housing 68 of operator section 24. A coupling 70 provides a point of attachment for the flow control device to suction line 20 and also defines a passage 72 through which the chamber defined by housing 68 communicates with the suction line. The condition of the interior of the housing chamber corresponds to the condition of the refrigerant leaving the evaporator and this in turn control the ambient of operating mechanism 40, specifically the bimetal. The position of valve needle 40 with respect to the restricted orifice is determined by the heat transfer between bimetal plate 46 and its ambient and, since the condition of the interior of housing 68 corresponds to the condition of the refrigerant leaving the evaporator, which is indicative of the load on the system, the flow control device will automatically adjust to compensate for changes in load on the system. For example, refrigerant leaving the evaporator coil below a particular temperature or in a liquid state indicates that the refrigerant is being supplied to the evaporator in an amount in excess of that required to handle the load on the system and, conversely, refrigerant leaving the evaporator in a gaseous state but at a temperature above a preselected temperature indicates that too little refrigerant is being furnished to the coil for a given load. These conditions will effect the ambient of the operating assembly and produce a compensating change in refrigerant flow.

One of the advantages of utilizing a condition responsive operator such as that disclosed to achieve this control is that not only does the control respond to temperature of the refrigerant but it also responds to the state of the refrigerant. It has been observed that in prior devices the response of the bimetal is so rapid that in some situations it causes the flow control device to hunt. In other words, when liquid refrigerant strikes the bimetal directly the bimetal is cooled so rapidly that it tends to over compensate by closing the valve in excess of what is required to balance the refrigerant supply with the load. This over-correction results in less refrigerant being supplied to the evaporator than is required for the load and the temperature then rises in the chamber causing the valve to open. Under such conditions the valves have been observed to hunt for the proper valve setting. This invention is concerned with this problem of over-correction of the temperature responsive operator due to direct impingement of liquid refrigerant on the bimetal. As a solution to this problem this invention proposed to prevent direct impingement of the liquid on the bimetal while maintaining a structure wherein the bimetal ambient corresponds to the condition, i.e. temperature and/or state, of the refrigerant leaving the evaporator. To this end, a barrier plate 74 is arranged in the chamber defined by housing 68. Plate 74 is in the form of a disk having its peripheral edge 76 clamped between peripheral edges 78 and 80 of portions 82 and 84 of housing 68. Plate 74 divides the interior of the housing into two compartments 86 and 88. The temperature controlled operating assembly 44 is positioned in compartment 88 and the other compartment is directly exposed to flow from the evaporator.

This arrangement physically separates operating assembly 44 from chamber 86 and thereby prevents direct impingement of liquid refrigerant on the bimetal. However, plate 74 is metallic and is preferably made of a material which is a good heat conductor so that the temperature in chamber 86 is readily transferred to chamber 88 and the temperature ambient bimetal 46 corresponds to the temperature in chamber 86. The arrangement is still responsive to refrigerant in a liquid state leaving the evaporator for liquid refrigerant striking plate 74 will cool the plate rapidly and also rapidly reduce the temperature in chamber 88 to increase the temperature differential between the bimetal plate and its ambient and thereby rapidly cool the bimetal and move the valve needle toward seat 38 to reduce flow. However, this cooling of the bimetal is not as severe as would be the case if the liquid refrigerant impinged directly on the bimetal.

In order to optimize the heat transfer relationship between chambers 86 and bimetal plate 46 the support for bimetal 46 includes an annular member 90 which engages the underside 92 of plate 74. Annular member 90 is also made of material having good heat transfer properties so that in addition to providing the support for bimetal plate 74 it also contributes in connecting the bimetal plate for response to the condition in chamber 86. This arrangement of plate and annular member engaging the bimetal provides a heat sink effect wherein the bimetal and its ambient respond to the heat sink. The temperature of the heat sink is not easily varied and this has a stabilizing effect on the overall control.

As can be seen in FIG. 3, bimetal plate 46 is generally elongated so that it has limited engagement with annular member 90 along diametrically opposed points. With this arrangement the bimetal plate is freely supported for deflection in response to energization of heater coil 54 and responds to the temperature and state of the refrigerant leaving the evaporator.

It will be noted that plate 74 is preferably dished so that surface 92 is concave with respect to bimetal plate 46. This plate configuration is preferred as it provides adequate clearance for deflection of the bimetal plate and also increases the surface area of the plate exposed to chamber 86 to optimize the heat transfer relationship between chamber 86 and chamber 88 and bimetal 46.

An additional advantage is afforded by the use of plate 74 to isolate the temperature responsive operating assembly from the suction line. The plate also isolates passage 30 from the suction line and there is no danger of refrigerant flow through directly to the suction line bypassing the evaporator. Without such isolation it was generally necessary to seal bore 42 with an O-ring or the like. This seal can be eliminated and, furthermore, close machining of the bore is not necessary. Thus, a simplification in structure and fabricating techniques also results from the isolation afforded by the plate.

Although but one embodiment of the present invention has been illustrated and described, it will be apparent to those skilled in the art that various changes and modifications may be made therein without departing from the spirit of the invention or from the scope of the appended claims.

I claim:

1. A fluid flow control device comprising, in combination:

means defining a first fluid flow passage through said device, means defining an orifice in said first passage, valve means mounted in said device for movement toward and away from said orifice for opening and closing said orifice, means defining a chamber in said device, operating means disposed in said chamber and connected to said valve means to establish a base opening of said valve means and a predetermined flow rate through said orifice, said operating means further operative to modulate said valve means about said base opening in accordance with the heat transfer between said operating means and its ambient, means defining a second passage opening into said chamber isolated from said first passage and adapted to be connected in a flow line to provide operative communication between said chamber interior and said flow line, and impervious barrier means in said chamber arranged operatively between said second passage and said operating means to prevent direct impingement of fluid entering said chamber on said operating means.

2. The combination of claim 1 wherein said barrier means defines first and second physically isolated compartments in said chamber, said second passage opening into said first compartment, said operating means disposed in said second compartment, and communication between said first and second compartments being through said barrier means with said barrier means being a thermal conductor so that the temperature of said operating means ambient corresponds to the condition of the fluid flowing in said flow line.

3. The combination of claim 2 wherein said barrier means comprises a plate of thermal conducting material having oppositely facing surfaces and a peripheral edge, said peripheral edge is connected to the inner wall of said chamber to divide said chamber into said first and second compartments on opposite sides of said plate.

4. The combination of claim 3 wherein said operating means comprises bimetal means and heater means in heat transfer relation with said bimetal means, and said bimetal means connected to said valve means and operative, when heated by said heater means, to move said valve means with respect to said orifice.

5. The combination of claim 4 including:

a generally annular member in said second compartment engaging one of the oppositely facing surfaces of said plate, said bimetal means engaging said annular member, and means biasing said bimetal means into engagement with said annular member, said bimetal means bowing with respect to said annular member to move said valve means.

6. The combination of claim 4 wherein said fluid flow control device is connected in a refrigeration system including a compressor, condenser, evaporator and conduits connecting said compressor, condenser and evaporator, said first passage connected between said condenser and evaporator and said second passage connected to the conduit on the exit side of said evaporator so that said valve means controls refrigerant flow to said evaporator and said valve means position is determined by the condition of the refrigerant leaving said evaporator.

7. The combination of claim 4 including:

a first housing portion containing said first passage and orifice, a second housing portion connected to said first housing portion and defining said chamber, said second passage defined in said second housing portion, and said valve means including an elongated valve needle supported in said first housing portion with one end thereof disposed at said orifice and the opposite end extending into said second compartment and engaging said bimetal means.

8. The combination of claim 7 wherein said plate is arranged generally normal to said valve needle with said valve needle projecting toward said plate, means supporting said bimetal means generally parallel to said plate and said bimetal means operative to bow generally in a direction normal to said plate and parallel to the longitudinal axis of said valve needle, and said plate being dished with said surface confronting said bimetal means being concave.

9. The combination of claim 8 wherein said heater includes an electrically insulated wire wound directly on said bimetal means and in heat transfer relation therewith.

References Cited

UNITED STATES PATENTS

| | | | |
|---|---|---|---|
| 2,400,335 | 5/1946 | Dodson | 62—202 XR |
| 2,471,448 | 5/1949 | Platon | 62—224 XR |
| 2,490,420 | 12/1949 | Davis. | |
| 2,642,724 | 6/1953 | Carter | 62—225 |
| 2,751,152 | 6/1956 | Ellenberger. | |

MEYER PERLIN, *Primary Examiner.*